(12) United States Patent
Fuccello

(10) Patent No.: US 7,493,083 B2
(45) Date of Patent: Feb. 17, 2009

(54) MOBILITY DEVICE ASSISTANT

(75) Inventor: James Robert Fuccello, Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 243 days.

(21) Appl. No.: 11/000,248

(22) Filed: Nov. 30, 2004

(65) Prior Publication Data

US 2006/0116160 A1 Jun. 1, 2006

(51) Int. Cl.
*H04Q 7/20* (2006.01)

(52) U.S. Cl. .................... 455/41.2; 455/556.1; 455/557

(58) Field of Classification Search ................ 455/41.2, 455/41.3, 517–520, 556.1, 557, 403; 710/106
See application file for complete search history.

(56) References Cited

U.S. PATENT DOCUMENTS

| | | | |
|---|---|---|---|
| 5,309,351 A | 5/1994 | McCain et al. | |
| 6,141,688 A | 10/2000 | Bi et al. | |
| 6,272,545 B1 | 8/2001 | Flanagin et al. | |
| 6,725,303 B1 | 4/2004 | Hoguta et al. | |
| 6,735,444 B2 * | 5/2004 | Wingren | 455/456.1 |
| 2004/0072580 A1 * | 4/2004 | Honda et al. | 455/456.1 |
| 2004/0185778 A1 * | 9/2004 | Biundo et al. | 455/41.2 |
| 2005/0088983 A1 * | 4/2005 | Wesslen et al. | 455/403 X |

OTHER PUBLICATIONS

International Search Report dated Mar. 7, 2007 for PCT Application Ser. No. PCT/US05/42487, 5 Pages.

* cited by examiner

*Primary Examiner*—Philip J Sobutka
(74) *Attorney, Agent, or Firm*—Amin, Turocy & Calvin, LLP

(57) ABSTRACT

System(s) and method(s) to automatically locate and/or connect to external devices is provided. A mobile computing device contains a mobility device assistant that is able to communicate with external devices, such as peripheral equipment and other devices. The mobility device assistant automatically searches via a wireless media to locate and communicate with the external device. The external device responds with relevant information about the external device. The external device can also communicate with the mobility device assistant via a proxy communication device or manager. The proxy manager maintains a database of information about those external devices that are unable to communicate. The mobility device assistant is configurable to locate and/or filter for specific external devices. The mobility device assistant can request external device information based upon an inferred state of the user or mobile computing device.

22 Claims, 7 Drawing Sheets

MOBILITY DEVICE ASSISTANT

FIELD OF THE INVENTION

The invention generally relates to communication systems and in particular to a system and method to automatically locate and/or connect to external devices.

BACKGROUND OF THE INVENTION

The usage of mobile communications systems utilizing mobile devices has become widespread. Retail stores and warehouses, for example, use such systems to track inventory and replenish stock. This information is entered by employees using a hand held or portable communication unit which can be carried through the store or warehouse. In a medical environment, these systems can reduce the time needed to fill out forms and eliminate inaccuracies by allowing medical personnel to transmit data directly from a mobile communication unit carried by the medical personnel.

Conventional systems allow users to access fixed base stations (e.g. access points) interconnected by a cable medium to form a hardwired network backbone. Each base station has a service area or cell surrounding the base station within which it is able to transmit and to receive data from other mobile communication units within the area. Also included in many systems are intermediate access points which are not connected to the network backbone but otherwise perform many of the same functions as the fixed access points. Intermediate access points, often referred to as wireless access points or base stations, increase the area within which access points connected to the system backbone can communicate with mobile devices. Unless otherwise indicated, the term "access point" will hereinafter refer to both access points hardwired to the system backbone and wireless access points.

Associated with each access point is a geographic cell. Such cell is a geographic area in which an access point has sufficient signal strength to transmit data to and receive data from a mobile device, such as a terminal or telephone with an acceptable error rate. Typically, access points will be positioned along the backbone such that the combined cell area coverage from each access point provides full coverage of a building or site.

Mobile devices such as telephones, pagers, personal digital assistants (PDAs), data terminals, etc. are designed to be carried through the system from cell to cell. Each mobile device is capable of communicating with the system backbone via wireless communications between the mobile device and an access point to which the mobile device is registered. As the mobile device roams from one cell to another, the mobile device will typically deregister with the access point of the previous cell and register with the access point associated with the new cell.

These systems provide acceptable coverage areas but do not provide information about the various external devices within the cell which a user can automatically locate and connect to or access to perform desired functions. Users need this type of capability to locate specific external devices, such as charging devices, synchronization devices, or other peripherals required for the work process and need to do this without having to spend time manually searching for devices.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The invention relates to a system and method that provides a mobile communication device with the ability to quickly locate and communicate with external devices. This invention can be embodied in a resident application or service in a mobile computing device that can search for and utilize services external to the mobile device as the device is carried though various service areas.

According to an aspect of the invention, a portable communication device includes a wireless component that facilitates the device communicating wirelessly with other devices and an interface component that interfaces with a mobile device assistant (MDA) component, wherein the MDA component informs the portable communication device of available resources. The portable communication device can automatically locate available resources or can be configured to locate user-specified available resources or located the available resources based upon an inferred user-state. The MDA component identifies a specific device among the available resources and informs the portable communication device of the location of the available resources. The MDA component also maintains a listing of available resources. The available resources are peripheral devices with which the portable communication device can interact, or they are external devices which interact with the user. The MDA component informs devices newly entered into its network of a subset of resources available to the respective devices.

According to another aspect of the invention, a communication architecture includes a network that includes a plurality of resources and a mobile device assistant (MDA) component that informs devices newly entered into the network of a subset of resources available to the respective devices. The newly entered devices may be portable communication devices. The available resources send a continuous wireless signal or send a wireless signal upon receiving a request from the MDA. The communication architecture further includes a proxy manager that communicates on behalf of a plurality of resources, the proxy manager contains identifying information about the plurality of resources.

According to yet another aspect of the invention, a method of using a communication system includes communicating wirelessly with a plurality of devices, interfacing with a portable communication device via a mobility device assistant (MDA), and informing the portable communication device of the existence of the plurality of devices. Communicating wirelessly with a plurality of devices further includes automatically detecting a signal from the plurality of devices and receiving a response from the plurality of devices. Communicating wirelessly also includes registering the plurality of devices with a proxy component, and communicating with the plurality of devices though the proxy component. Informing the portable communication device of the existence of the plurality of devices is based upon an inferred state of the portable communication device.

According to still another aspect of the invention is a computer readable storage medium for allowing a portable communication device to locate a plurality of resources in a network including a wireless component operable to communicate with other devices and an interface component adapted to interface with a mobility device assistant (MDA) component of the portable communication device. The interface component transmits and receives data from the plurality of resources via wireless communication and can transmit and receive data from a proxy unit that communicates for the plurality of resources. The MDA informs the portable communication device of the plurality of resources.

According to another aspect of the invention, a portable communication system including means for wireless communication with a plurality of devices, means for determining existence of available resources, and means for informing a user about the existence of available resources. The portable communication system further includes means for requesting available resources information and means for receiving the available resources information.

In accordance with the invention, a mobile communication system includes an external device and a mobility device assistant coupled to a mobile communication device. The mobility device assistant is operative to communicate with the external device and can automatically scan its environment for the external device. The mobile device assistant can also be configured to scan a plurality of external devices for a subset of external devices containing a specific external device though a filter mechanism. The external device can be active and continuously send a signal, or it can be passive and only send information upon receiving a request for information from a mobility device assistant. The mobility device assistant can maintain in its database or register information about each external device.

According to another aspect of the invention a proxy manager is provided that communicates for external devices that do not communicate and/or devices, such as legacy devices, that can communicate but do not understand the mobile communication system protocol. The proxy manager maintains information, such as location information, about the external devices. The proxy manager communicates the external device information to the mobility device assistant.

Furthermore, the mobility device assistant can communicate with a separate or second mobile device. The separate mobile device can request external device information for external devices which are not yet within its geographic cell. Upon receiving a request from the separate mobile device, the mobility device assistant can send a listing of its known and registered external devices and/or available GPS coordinates to a mobility device assistant included in the separate mobile device. In this way, the range of the separate mobile device is expanded to include the range of the mobility device assistant which it has accessed.

According to another aspect of the invention, a method of mobile communication includes scanning for an external device and requesting external device information. Upon receipt of the request, an external device or a proxy manager acting on behalf of an external device responds to the request and sends information to a mobile device. The mobile device receives the information and logs it into a database or updates an existing database. Scanning for the external device can be continuous and automatic, based upon an inferred state of the user, or activated upon user-request.

To the accomplishment of the foregoing and related ends, certain illustrative aspects of the invention are described herein in connection with the following description and annexed drawings. There aspects are indicative, however, of but a few of the various ways in which the principles of the invention can be employed and the subject invention is intended to include all such aspects and their equivalents. Other aspects, advantages and novel features of the invention will become apparent from the following detailed description of the invention when considered in conjunction with the drawings.

DETAILED DESCRIPTION OF THE INVENTION

Figure 1:
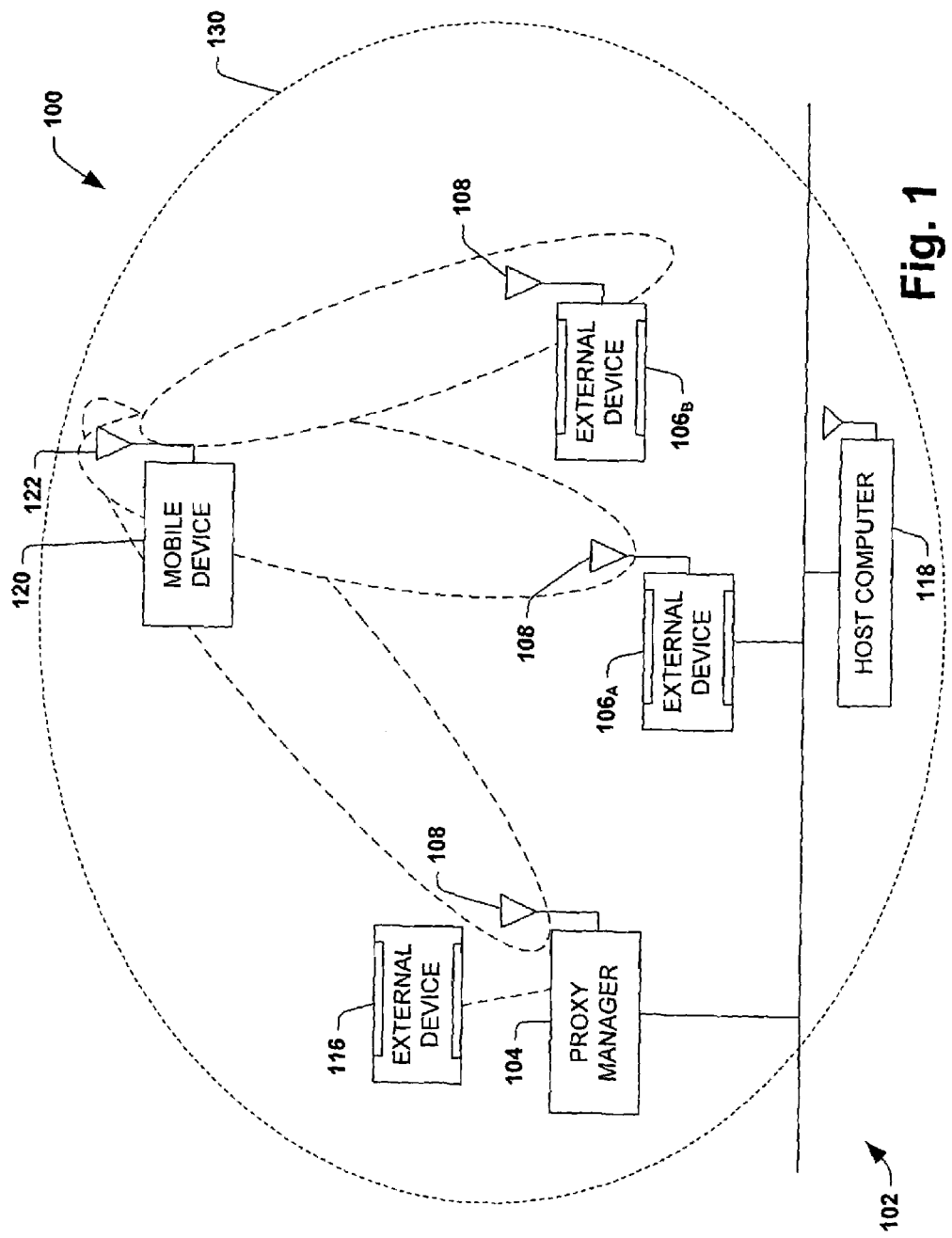
FIG. 1 illustrates an exemplary mobile communication system in accordance with an aspect of the invention.

The subject invention is now described with reference to the accompanying drawings, which form a part hereof, wherein like reference numerals are used to refer to like elements throughout. In the following description, for purposes of explanation, numerous specific details are set forth in order to provide a thorough understanding of the invention. It may be evident, however, that the invention may be practiced without these specific details. In other instances, well-known structures and devices are shown in block diagram form in order to facilitate describing the invention. It is to be understood that other embodiments may be utilized and changes may be made without departing from the scope of the invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to FIG. 1, illustrated is an exemplary mobile communication system or architecture 100 in accordance with an aspect of the invention. The mobile communication system 100 includes a network backbone 102, such as, for example, a local area network (LAN). The network backbone 102 may be a hardwired data communication path made of twisted pair cable, shielded coaxial cable or fiber optic cable, for example, or may be wireless or partially wireless in nature. Coupled to the network 102 is a plurality of resources including a proxy manager 104 and several external devices 106. The term external device as used herein refers to any device that can communicate with a mobile unit and/or any device which a user may want to locate, even if that device cannot communicate or interact with a mobile device 120. Only one external device $106_A$ is shown hardwired to the network backbone 102, however, it is understood that more than one hardwired external device $106_A$ may be physically connected to the network backbone 102. The external device 106 may be hardwired to the network 102 such as external device $106_A$ or may be wirelessly coupled to the backbone 102 such as external device $106_B$.

The proxy manager 104 serves as a proxy agent for any external device 116 that is not able to communicate itself and/or for devices, such as legacy devices, that are able to communicate but do not understand the mobile communication system protocol. External devices can be those that support connections but which do not support service or function retrieval. Examples of external devices 116 which can communicate or be registered through a proxy manager 104 include printers, faxes, scanners, vending machines, telephones, cradle, overhead projectors, plotters, . . . The external device 116 is shown connected to the proxy manager 104 via a dotted line to indicate that that there may not be a physical or hardwire connection between the proxy manager 104 and the external device 116. The proxy manager maintains a register or listing of the external devices 116 within its environment. The environment can include a building, campus, home, or even an entire town or city. For example, the proxy manager 104 may store and maintain a GPS coordinate or cellular based location that identifies where a certain external device 116 is located in the proxy manager's 104 environment. It is also understood that more than one external device 116 may be registered with a proxy manager 104. Additionally, there may be more than one proxy manager 104 in the mobile communication system 100. It is also understood that while the proxy manager 104 is shown physically connected or hardwired to the network backbone 102, the proxy manager may be wireless or partially wireless in nature. The proxy manager may be a separate system or it may be part of an internal system.

Each external device 106 either autonomously or through a proxy manager 104 is capable of wirelessly communicating with other devices in the mobile communication system 100 via respective antennas commonly denoted by reference numeral 108. The antenna 108 for any particular device may be of any type suitable for use in a mobile communication system, such as an omni-directional antenna, a yagi-type antenna, etc. A geographic cell (shown by circle 130) may contain one or more external devices 106 or proxy managers 104 and defines a region of coverage in which successful wireless communication may occur. Depending on the type of antenna 108 selected and output power of the respective external device 106 or proxy manager 104, the geographic cell 130 may take one of several different forms and sizes. For example, the antenna 108 could be an omni-directional antenna if a generally spherical cell area of coverage is desired. A directed yagi-type antenna could be used as the antenna 108 for a more directed elliptical cell area of coverage.

The mobile communication system 100 also includes one or more portable or mobile communication device(s) 120. The mobile communication device may be a mobile computing device, personal digital assistant (PDA), barcode scanner, or the like. Each mobile communication device 120 includes an antenna 122 for wirelessly communicating with other devices. Each mobile communication device 120 communicates with external devices 106 and/or proxy manager 104 on the network 102 and/or with other mobile communication devices, and/or directly with a host computer 118 if within cell range of the host computer 118 via wireless technology. Upon roaming from one geographic cell to another, the mobile communication device 120 is configured to associate itself with a new external device(s) 106 or proxy manager(s) 104 or directly with the host computer 118 if within range. A mobile communicate device 120 automatically scans the geographic cell 130 to locate and/or communicate with an external device 106 and/or a proxy manager 104. The infrastructure allows users to capture data from external devices, such as peripherals, move the data to available peripherals, and manage these peripherals without having to manually locate and determine how to connect to these peripherals.

The geographic cell 130 may represent the range of a service area or an access point (not shown). The mobile unit finds an access point which serves as an entrance point through which wireless communications may occur with the network backbone 102. The wireless access point may be employed to expand the effective communication range of the mobile communication system 100. As is conventional, each wireless access point associates itself, typically by registration, with another access point or a host computer 118 coupled to the network backbone 102, whether hardwired or wireless, such that a link is formed between itself and other devices situated on the network backbone 102.

Figure 2:
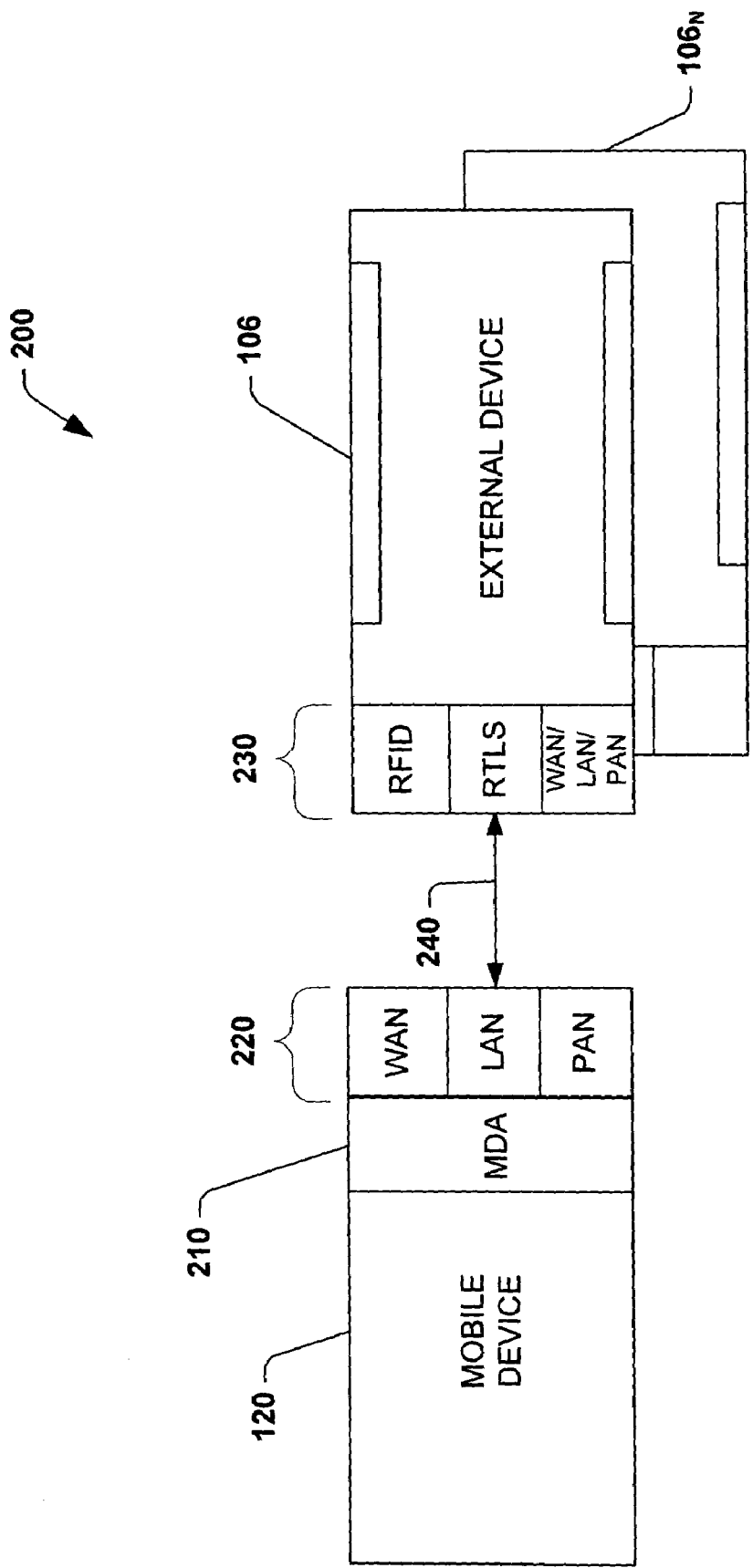
FIG. 2 illustrates a mobile communication system in accordance with an aspect of the invention.

Referring now to FIG. 2, a schematic representation of a mobile system 200 in accordance with an aspect of the invention is shown. The system 200 includes a mobile device 120 and an external device 106. Multiple external devices, represented as $106_N$, may be associated with the mobile device 120. The external device 106 can be hardwired, such as external device $106_A$, or wireless, such as external device $106_B$, both shown in FIG. 1. Additionally more than one mobile device 120 may be utilized with the external device 106 at any given time. The system 200 provides an interface or communication link 240 between the mobile device 120 and external device 106. Whereby the mobile device sends a request to locate an external device and the external device responds with relevant information.

The mobile device 120 includes a mobility device assistant (MDA), represented at 210. The MDA 210 is an application, program, or process that runs continuously in the background of the mobile device 120 and is operable to interface with the mobile device. That is to say, the MDA may be a self-running task that carries out its function behind the scenes while the user is actively performing other functions in the foreground of the mobile device 120. Thus, the MDA 210 operates in such a way that it does not interfere with the other programs, applications or tasks the user may be performing. The MDA 210 searches for external devices via a wireless communication system, represented by item 220, for external devices or resources which are or may become available. The MDA is able to automatically locate and pair with peripheral devices. It actively performs this search and looks for peripherals that can answer and report peripheral/external device function using available wireless technology, such as such as radio frequency (RF), infrared data association ports (IrDA), radio frequency identification (RFID), global positioning system (GPS), real time locating systems (RTLS), . . . Additionally, various wireless communication storage mediums can be employed with the mobile system 200 including local area networks (LANs), wide area networks (WANs), personal area networks (PANs), infrared data association ports (IrDA), IEEE 802.11, Bluetooth, and the like.

The MDA 210 is operable to be proactive whereby it automatically searches or scans its external environment for external devices that have newly entered the network of a subset of resources available to the respective devices. The automatic searching or scanning can be continuous or periodic to conserve power. Once an external device 106 is located and identified, the MDA updates an internal register. This internal register can be embodied in a computer readable storage media of the mobile device. It is also understood that the MDA can inform the mobile device of available resources though other known technology. When the user desires to locate or interact with a particular external device 106, the user scans the internal register or database that contains information about the external devices 106 identified by the MDA 210. The user can then chose which device to interact with or which device to locate. The MDA can also automatically notify the user when an external device is located based upon an inferred user state. For example, the MDA may infer that the user desires to print a document. The MDA would automatically search for available printers based upon this inference and send a signal or message to the user that a printer is identified and ready for use.

In another embodiment, the MDA 210 can be reactionary whereby the MDA only searches for external devices 106 upon a user request. For example, the user may configure the MDA to search for a particular type of external device, such as a printer for example, and the MDA only performs a search for printers at the user's direction. In this way, usage of system resources can be reduced when desired. The user may also filter for a subset of external devices. For example, the user may be searching for a particular vending machine, identified by serial number. The MDA will search through its identified vending machines until the one with the correct serial number is located and matched with the user specified criteria.

The external device 106 can be configured as passive or active. Active external devices are configured to continuously output a signal or beacon for all mobile devices to detect. Passive devices only answer specific requests from the MDA. Thus, if the MDA is searching for a particular external device, the passive device will receive a signal from the MDA and, if appropriate, respond to that signal. The signal or beacon 230 can be any form of wireless communication technology.

The following is provided by way of illustration and not limitation, as a user carries the mobile device 120 from place to place the mobile device 120 may go in or out of range of a geographic cell containing one or more external devices. The MDA 210 can detect which external device 106 is accessible by the mobile device 120 at each point in time. For example, a user may be internal to a building, home, or structure or external to a structure, such as riding in a vehicle. The MDA actively performs a search using available technology such as radio frequency (RF), infrared data association ports (IrDA), radio frequency identification (RFID), global positioning system (GPS) . . . The external device 106, or proxy manager 104, is able to answer the MDA 210 and report regarding its function. Thus, as a user carries a mobile device from place to place various external services, or peripheral devices, such as power sources, internet kiosks, displays, printers, phones, headsets, projectors, etc. can be located and paired with to enhance the set of capabilities found in the mobile device.

By way of further illustration and not limitation, as one carries the mobile computing device into a store, the device finds and pairs with the store's wireless LAN Access Point and provides product information to the user. If the user is at the workplace an identification tag for power, charging, external antennas, printers, faxes, etc. may be available. This information can be presented to the user of the mobile computing device and the user may chose to connect their device to the power, charger, or fax machine. The same principle can be applied to carrying the device on the street (WAN, internet hot spots, etc.), in vehicles (internet for flight/travel schedules, power, audio, video, GPS, etc) or in homes (power, antennas, cables, printers, A/V equipment). Additionally, information regarding locations (GPS coordinates) of available services may be passed from one mobile computing device to another passing by to assist others in locating specific services.

Figure 3:
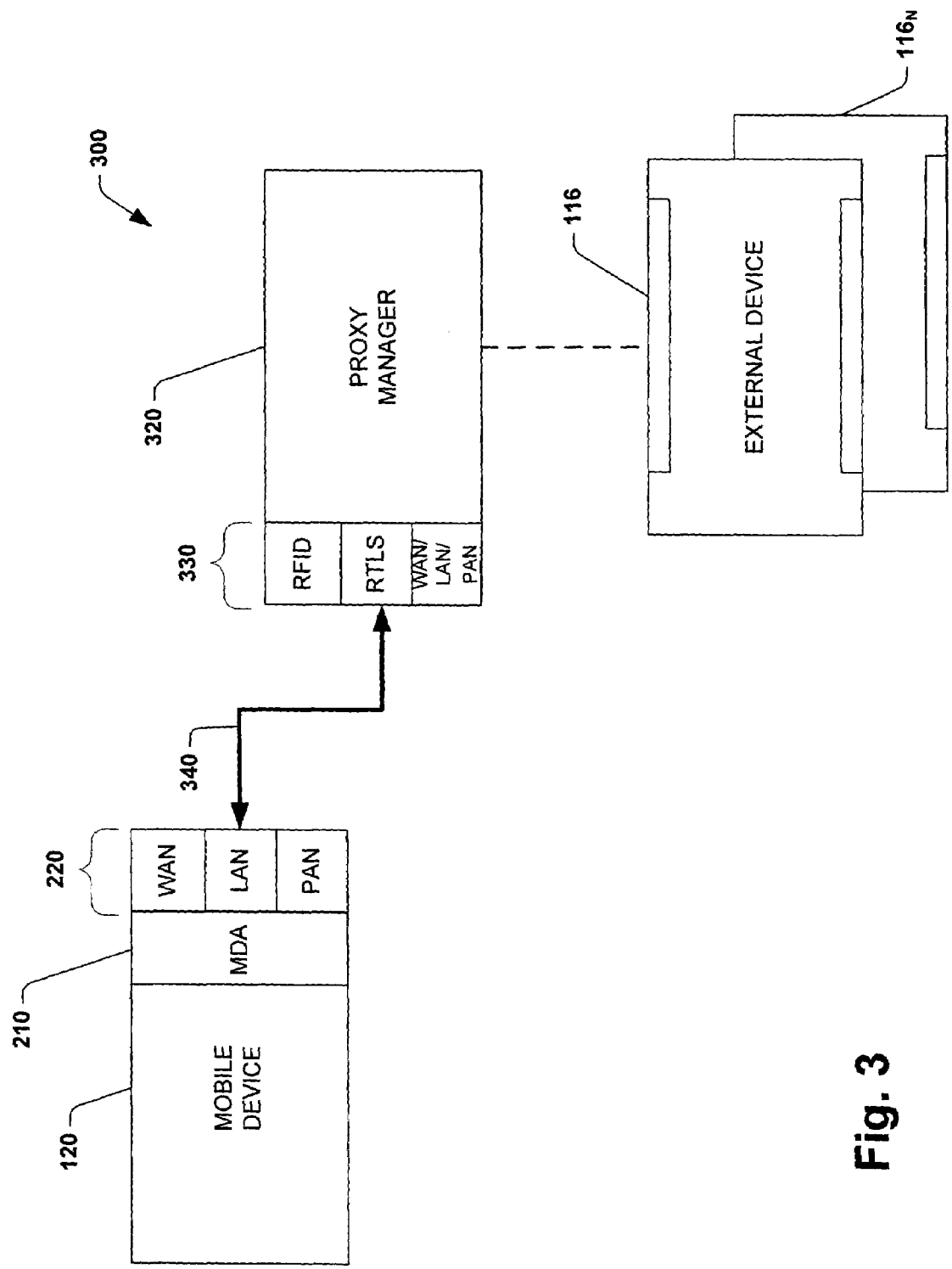
FIG. 3 illustrates a mobile communication system in accordance with an aspect of the invention.

With reference now to FIG. 3, illustrated is a schematic representation of a mobile system 300 in accordance with another aspect of the invention. The mobile system 300 includes a mobile device 120, an external proxy manager or communication manager 320 and an external device 116. It is understood that more than one peripheral device, shown at 116$_N$, can be associated with a proxy manager 320. Additionally, more than one proxy manager can be utilized in the same network environment or geographic cell. The mobile device 120 includes a MDA 210 that seeks its environment for external devices. The MDA is capable of communication 220 with an external device 340 via wireless technology 220, 330.

The proxy manager 320 acts as a proxy agent for external devices which are not able to communicate for themselves. This include such external devices as printers, scanners, power equipment, plotters, phones, overhead projectors, vending machines, copiers, . . . . The external device, according to this invention, is not limited to those devices which interact with the mobile device and can be any device with which the user interacts with directly. The dotted line connecting the proxy manager 320 and the external device 116 indicate that these devices do not have to be connected either wirelessly or physically. The proxy manager 320 and the external device 116 may not communicate. For these devices, the proxy manager 320 may contain a GPS coordinate or a cellular based location of the external device 116. For example, a proxy manager in a large building may have a listing of all copiers within the building. The copier location, e.g. floor, room number, department, is stored in the proxy manager memory. When a mobile device requests the closest copier, either automatically, by inference or based upon user-request, the proxy manager communicates with the MDA to provide a listing of all its registered copiers. The proxy manager can also detect where the mobile unit is located in the building and provide only information for copiers that are in the closest proximity to the MDA based on, for example, the GPS coordinates of both the mobile device 120 and the external device 116. The mobility device assistant 220 may also perform this function for external devices 106, 116 without the assistance of a proxy manager 320.

Figure 4:
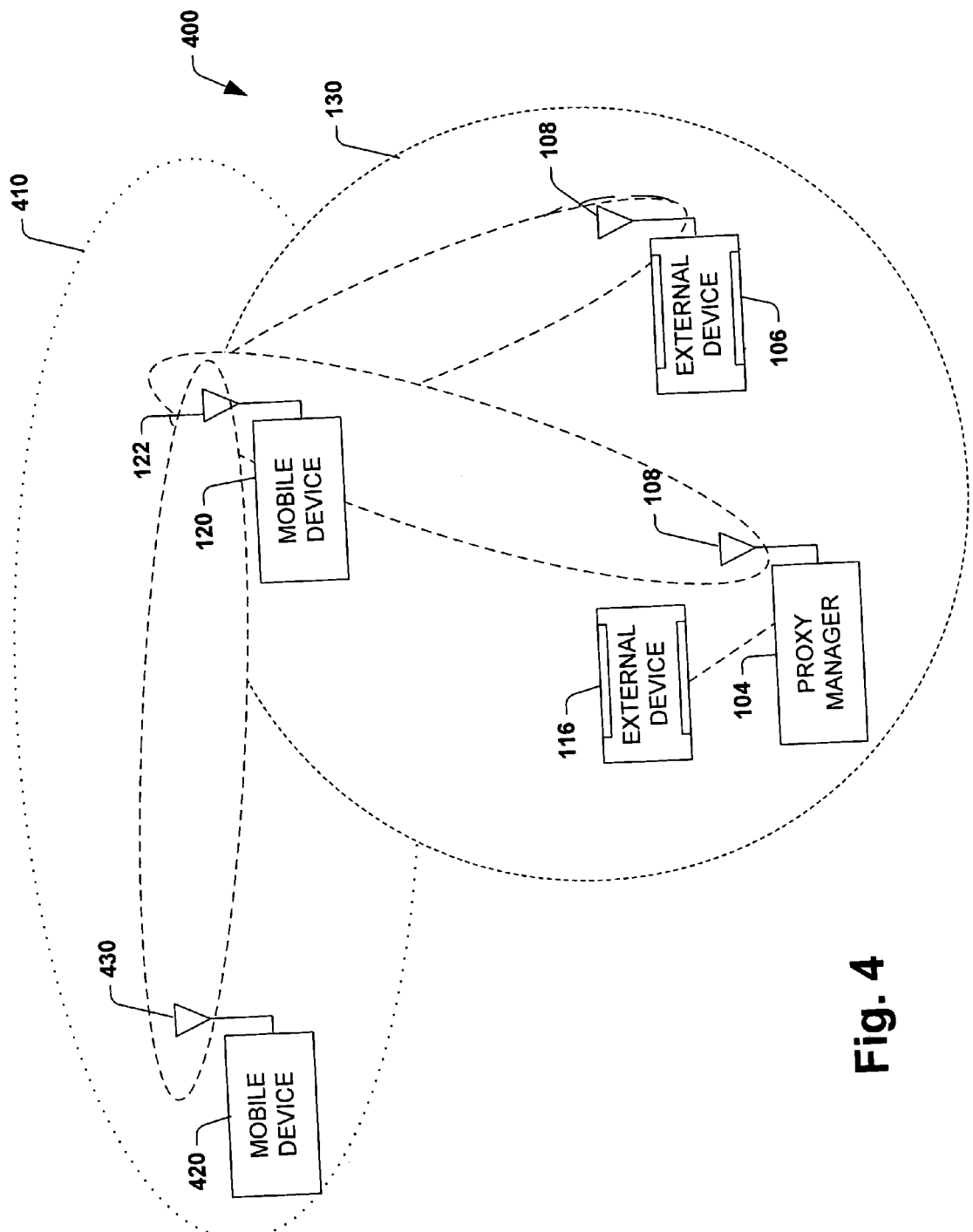
FIG. 4 illustrates an exemplary mobile communication system in accordance with an aspect of the invention.

FIG. 4 illustrates a system 400 in accordance with an aspect of the invention. In addition to and concurrent with performing the functions described with reference to FIGS. 2 and 3, the mobile device 120 may communicate with another mobile unit. The system 400 has a mobile device 120 and one or more external devices 106 and/or one or more proxy managers 140. The external device(s) 106 and proxy manager(s) 104 may be physically connected to a network backbone or wireless. The external device 106 and proxy manager 104 communicate or interface with the mobile device. The mobile unit 120 can interface with the external device and/or proxy manager via a MDA using wireless technology. The MDA identifies and external device and updates a database with the pertinent external device information. The MDA and external devices 106, 116 are located in a particular geographic cell or service area 130 and communicate via respective antennas 108, 122.

In addition to being in cell 130, the mobile device 120 may be within the geographic cell 410 that contains signals from a separate or second mobile device 420. This second mobile device 420 has a mobility device assistant and is able to communicate wirelessly to search for external devices. The second mobile device 420 may be able to communicate with a pier mobile device 120 via respective antenna 430, 122, but not able to communicate with external devices 106, 116 within the separate geographic cell 130. For example, mobile device 120 and second mobile device 420 may be moving toward each other. Mobile device 120 may be still located in geographic cell 130 and situated where cells 130 and 410 overlap. Alternatively, mobile device 120 may be out of range of cell 130 but still maintains a database of external devices 106, 116 within that cell. The second mobile device 420 may be entering or close to geographic cell 130. If second mobile device 420 is searching for external device information, it is able to contact and access information from the mobile device 120. This "hand off" of information extends second mobile device's cell range and notifies the user of the proximity of external devices 106, 116.

Figure 5:
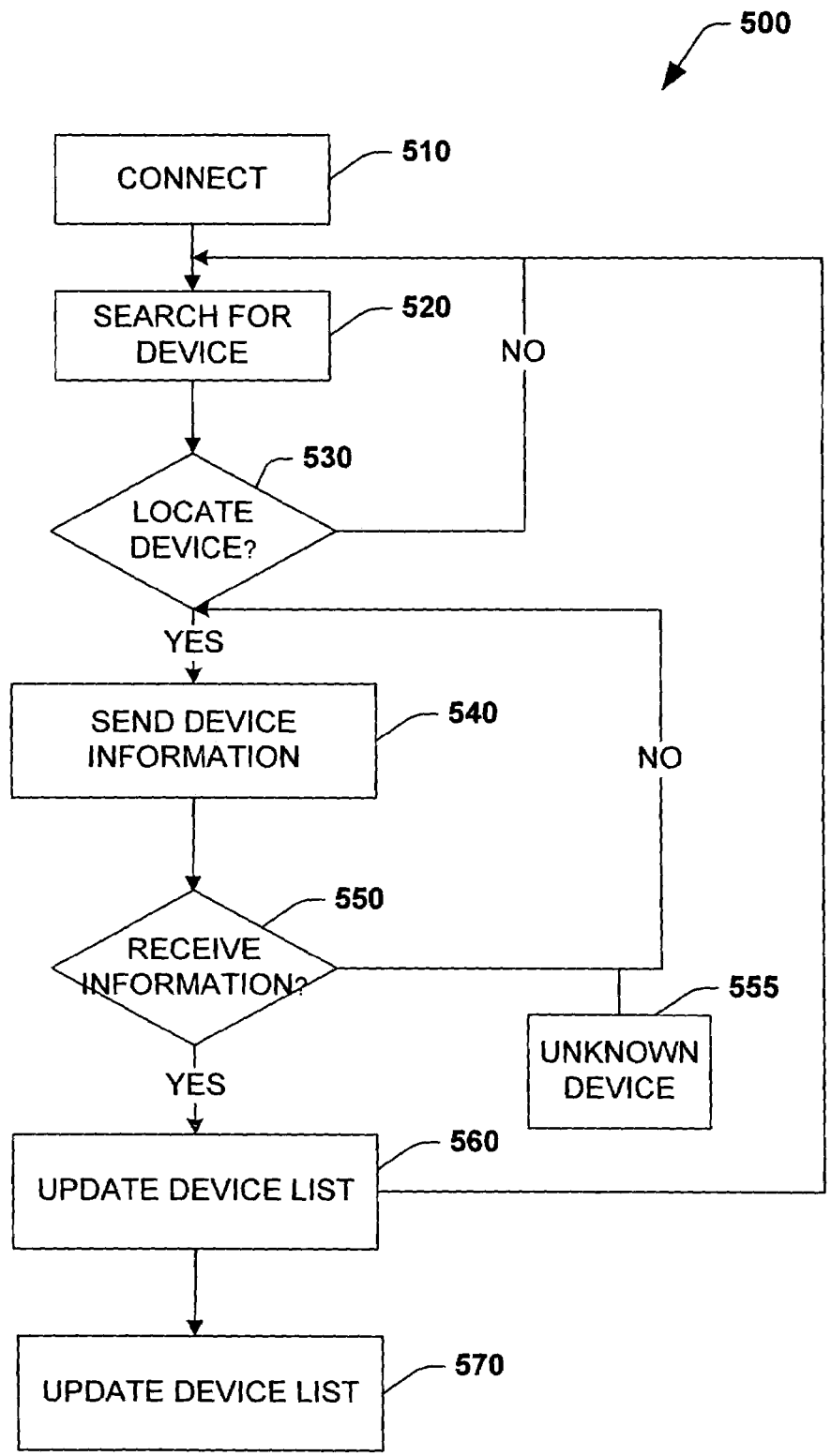
FIG. 5 is a flow diagram illustrating one particular methodology in accordance with the invention.
Figure 6:
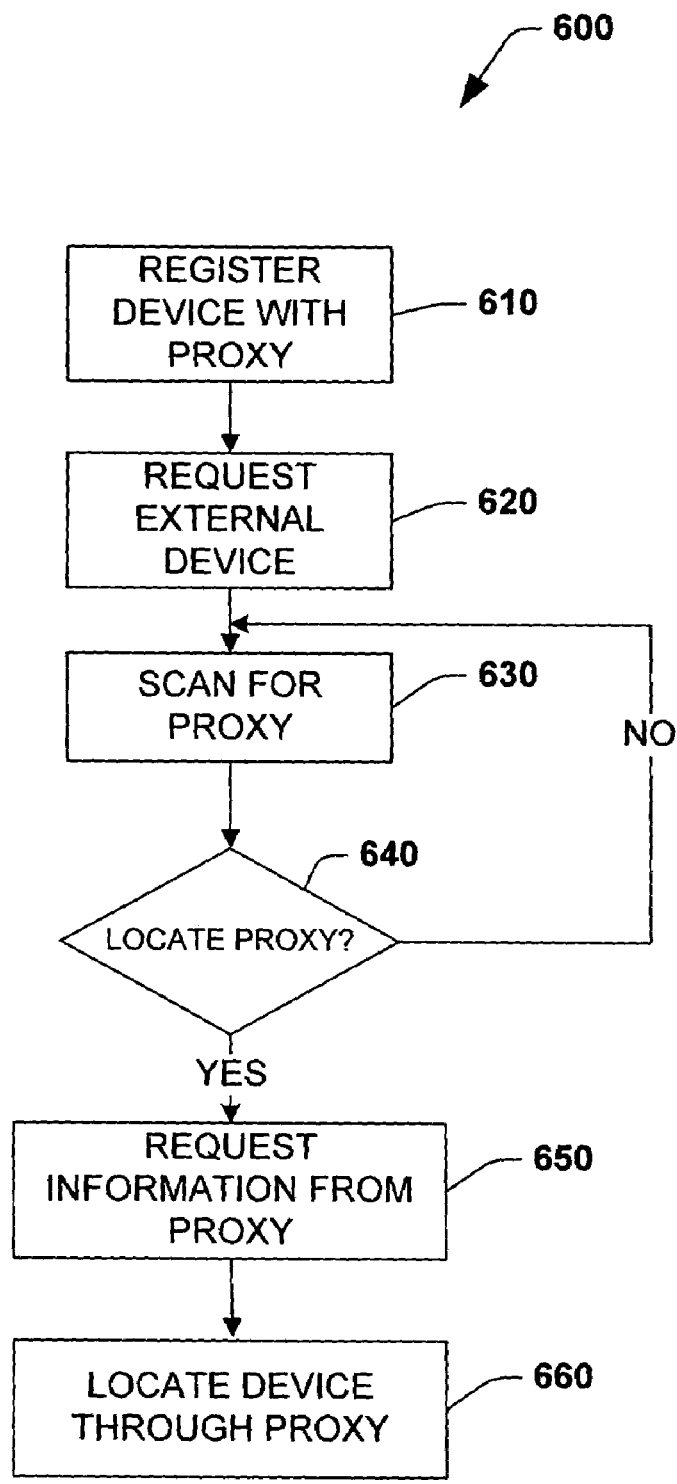
FIG. 6 is a flow diagram illustrating another methodology in accordance with an aspect of the invention.
Figure 7:
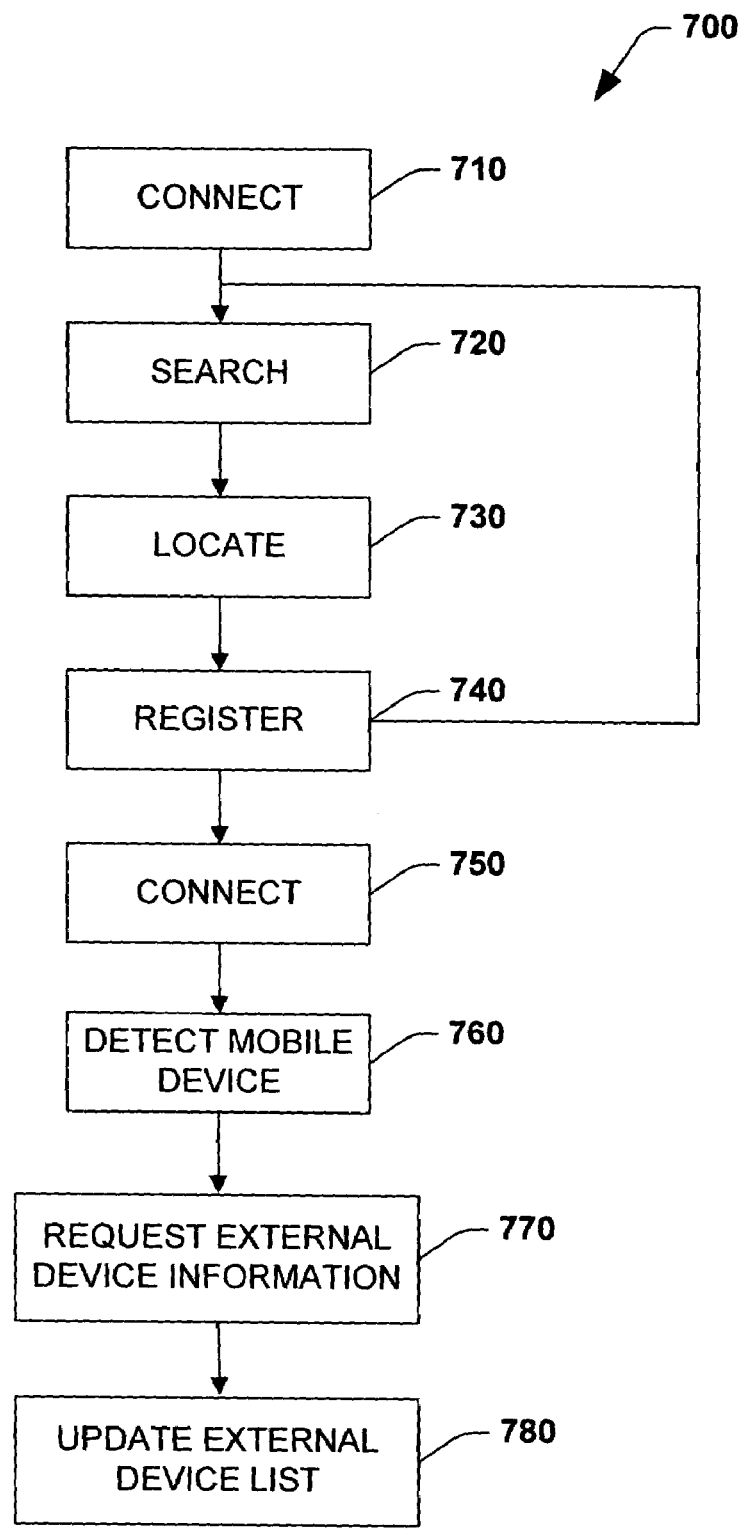
FIG. 7 is a flow diagram illustrating another methodology in accordance with an aspect of the invention.

Certain methodologies that can be implemented in accordance with the invention are illustrated in FIGS. 5, 6 and 7. While, for purposes of simplicity of explanation, the methodologies are shown and described as a series of blocks, it is to be understood and appreciated that the invention is not limited by the order of the blocks, as some blocks can, in accordance with the invention, occur in different orders and/or concurrently with other blocks from that shown and described herein. It is also to be understood that the methodologies illustrated and described with FIGS. 5, 6 and 7 can be used concurrently. Moreover, not all illustrated blocks may be required to implement the methodologies in accordance with the invention.

Referring to FIG. 5 illustrated is a flow diagram 500 of one particular methodology in accordance with the invention. At 510 a mobile device, such as a mobile computing device enters a service area or geographic cell, such as a geographic cell defined by an access point, and is connected or associated with a mobile system. At 520, the mobile device via a mobility device assistant (MDA) automatically or configurably searches for external devices, such as a peripheral device. The MDA is an application, process or program that operates in the background of the mobile device and may perform its function automatically, by inference or only upon user request. When searching automatically, the MDA continuously searches for all external devices sending a signal via an antenna, for example, and performs this function without user intervention. When in a configurable mode, the MDA only searches for a device based upon user input. For example, a user may request the MDA search for all devices within the environment or only for specific devices, such as a specific printer. The user may also configure the MDA to search for a specific device which can be a subset of all available devices, thus narrowing the search criteria. Alternatively, the MDA may search for an external device based upon an inferred user state whereby the MDA searches for the device and notifies the user of its existence and availability. For example, the MDA or other storage media in the mobile unit may detect that the mobile unit requires a battery recharge. The MDA will recognize this state and infer that a charging device or power source is required and perform a search of all power supplies or chargers in the environment. Upon locating a suitable device, the MDA will notify the user, through a prompt or other notification method, of the inferred state or condition and the external devices available to rectify the condition.

At 530 a determination is made whether an external device is located. If the MDA does not locate an external device it will continue searching at 520 for an external device. If the MDA locates a device, it continues to 540 and sends a request for information to the external device. The request is sent via any type of wireless storage medium accessible to the MDA. At 550, a determination is made whether the external device responded to the MDA request for information. The MDA may monitor the request and receipt of data from the external device. If a response is not received within a set period of time, for example, fifteen seconds, the MDA may send a second request at 540 and may do so for a specific number of attempts. If a response is still not received from the external device, the MDA may enter a fault condition, at 555, whereby the external device is listed as an "unknown" device.

When the MDA receives information from the external device a register internal to the mobile device is updated, at 560. For example, the MDA may contain a register listing the device name, function, serial number, location, etc. The MDA may also be configured to maintain this information permanently, semi-permanently, or only while the mobile device is located in a specific geographic cell or accessible to a particular access point. For example, if a user continuously requires information regarding a certain environment, the MDA may maintain a permanent listing of registered external devices in that environment. When the user enters that particular environment, the MDA can automatically detect the environment and attempt to contact the external devices it has registered to determine if they are still accessible. The MDA may also search for additional external devices that it was not able to contact on a previous attempt or those devices which are new to the environment.

Once the information concerning the external device is updated at 560, the MDA continues to search for other external equipment at 520. Thus representing a continuous loop while the MDA is active and/or in a particular environment or user state. That is to say, if the user has configured the MDA only to search for certain external devices, the MDA will continue the search until all external devices in the requested class or sub-class are identified and/or until the user requests the MDA to discontinue searching. Once the external device information is updated in the device list at 560, the user is able to pair with the external device at 570, if desired.

FIG. 6 is a flow diagram illustrating another methodology 600 in accordance with an aspect of the invention that can be used concurrently with the methodology shown and described with reference to FIG. 5. At 610, an external device is registered with a proxy manager. The information relative to the external device can be manually programmed into storage media of the proxy manager. The proxy manager is not required to interface with other devices in a network, it may be associated with other devices in a network, or it may be part of a computer readable storage media of a network. The external devices registered with the proxy manager can be system devices, such as printers or scanners, or other devices, such as telephones or copy machines, additionally the external devices may be non-system devices. For example, the external devices registered with the proxy manager may be fire extinguishers distributed throughout a building or factory. The proxy manager maintains a listing of all fire extinguishers with the respective locations within the building, such as GPS coordinates, room number, floor, department, or other location identifying methods. The proxy manager is then able to provide this information on behalf of the fire extinguisher. It is understood that any device, article or item may be registered with a proxy manager depending on the user requirements.

At 620 a mobile device sends a request for an external device automatically based upon a condition or inferred state, or based upon a user generated request. The mobile device at 630 scans for a proxy manager that represents an external device. At 640 a determination is made if a proxy manager has been located. If no proxy manager is located, or if the proxy manager located is not the required device, the process continues at step 630 until the proper proxy manager is located. If at 640 the proxy manager is located, the process continues at 650 wherein the mobile device requests information from the proxy manager. The proxy manager responds with information concerning the external devices which it is aware. This information can include location, serial number, device name, or other pertinent data, and is stored in an accessible database or register. If the proxy manager does not respond with the information in a reasonable amount of time the mobile device may continue to send multiple requests as described with reference to FIG. 5. With this information the user is able, at 660, to locate the external device through the information provided by the proxy manager. Thus, the user has saved time and energy locating the external device through the proxy manager.

FIG. 7 is a flow diagram illustrating another methodology 700 in accordance with an aspect of the invention. It is to be understood that this methodology is used in conjunction with the methodologies shown and described with reference to FIGS. 5 and 6. At 710 a mobile device, such as a mobile computing device, is connected to an access point representing a geographic cell or service area. The mobile device searches for external devices at 720 either continuously, via a user prompt or automatically via inferred user states. At 730, an external device is located via information received directly from the external device or through a proxy manager. Once a device is detected and data relative to the external device is communicated to the mobile unit, the information is maintained in the mobile unit. For example, this information can be maintained on a computer readable storage medium of the mobile device. The mobile device may maintain this information internally or it may record the information on an external device, such as a host computer. At this point the mobile device may continue to search for other external devices and continue to search and register these devices.

Proceeding to 750, a second mobile device is connected to the same or a second geographic cell, in which the external devices and/or proxy managers associated with the first geographic cell are not associated or not yet defined. If the user of the second mobile device is entering, or about to enter, the range in which the first mobile device is currently in, or has just left, the second mobile device may detect the first mobile device at 760. The second mobile device may request information from the first mobile device concerning the external devices and/or proxy managers which are registered with the first mobile device. In this way the mobile devices "hand-off" information. For example, if the second mobile device is searching for a telephone and is not able to find one in its geographic area, it may detect the first mobile device and request any information relative to telephones. The information requested may also be a listing of all external devices and proxy managers which the first mobile device is aware. Upon receipt of the information from the first mobile device, the second mobile device updates its listing of external devices at 780. In this way, the range of the second mobile device is expanded.

Thus, a user is able to locate and communicate with external devices via a mobile device. The mobile device, through a mobility device assistant scans for the external devices and provides the user with device information including access information. For those external devices which cannot communicate, a proxy manager is provided through which the external device and the mobile device can communicate.

What has been described above comprises examples of the invention. It is, of course, not possible to describe every conceivable combination of components or methodologies for purposes of describing the invention, but one of ordinary skill in the art can recognize that many further combinations and permutations of the invention are possible. Accordingly, the invention is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A portable communication device, comprising:
a wireless component that facilitates the portable communication device communicating wirelessly with external devices associated with an access point to which the portable communication device is accessing;
an interface component that interfaces with a mobile device assistant (MDA) component, the MDA component infers an action that a user utilizing the portable communication device desires to perform based upon the current actions of the user, the MDA component automatically locates one or more of the external devices that facilitates performing the inferred action of the user and the MDA component informs the portable communication device of the one or more of the external devices; and
a proxy manager that interfaces with the MDA component and acts as a proxy agent for external devices not able to directly communicate with the MDA component.

2. The portable communication device of claim 1, the MDA component automatically locates the one or more of the external devices.

3. The portable communication device of claim 1, the MDA component is configurable to locate user-specified external devices.

4. The portable device of claim 1, the MDA component identifies a specific device among the external devices.

5. The portable communication device of claim 1, the MDA component informs the portable communication device of newly entered available external devices associated with the access point.

6. The portable communication device of claim 1, the external devices are peripheral devices.

7. The portable communication device of claim 1, the MDA component informs the portable communication device of the location of the external devices.

8. The portable communication device of claim 1, the MDA component maintains a listing of external devices.

9. The portable communication device of claim 8, the MDA component can be configured by the user to maintain the external devices in the listing of external devices only while the portable device is accessing the access point to which the external devices are associated.

10. A communication architecture, comprising:
a network that includes a plurality of external devices;
a mobile device assistant (MDA) component that automatically informs a portable communication device newly entered into the network of a subset of external devices available to the portable communication device, the MDA component infers an action that a user utilizing the portable communication device desires to perform, the MDA component locates one or more of the external devices that facilitates performing the inferred action of the user; and
a proxy manager that communicates on behalf of at least one of the plurality of external devices and provides identifying information about the at least one of the plurality of external devices.

11. The communication architecture of claim 10, the external devices send a continuous wireless signal.

12. The communication architecture of claim 10, the external devices send a wireless signal upon receiving a request from the MDA.

13. The communication architecture of claim 10, the proxy manager contains identifying information about the plurality of external devices.

14. The communication architecture of claim 10, the MDA component dynamically maintains a listing of external devices.

15. A method of using a communication system, comprising:
communicating wirelessly with a plurality of external devices;
interfacing with a portable communication device via a mobility device assistant (MDA);
informing the portable communication device of the existence of one or more of the plurality of external devices based upon an inferred state of a user associated with the portable communication device, wherein the inferred user state comprises an inferred action that the user desires to perform, wherein the one or more of the external devices facilitates performing the inferred user desired action; and
transmitting data to and receiving data from a proxy component that communicates on behalf of at least one of the plurality of devices not able to directly communicate with the MDA.

16. The method of claim 15, communicating wirelessly with the plurality of external devices further comprising:
automatically detecting a signal from the plurality of external devices; and
receiving a response from the plurality of external devices.

17. The method of claim 15, communicating wirelessly with the plurality of external devices further comprises:
registering the plurality of external devices with the proxy component; and
communicating with the plurality of external devices though the proxy component.

18. A computer readable storage medium for allowing a portable communication device to locate a plurality of external devices in a network, comprising:
a wireless component operable to communicate with the plurality of external devices;
an interface component adapted to interface with a mobility device assistant (MDA) component of the portable communication device, wherein the MDA component searches for one or more of the plurality of external devices depending upon an inferred state of a user employing the portable communication device, wherein the inferred user state comprises an inferred action that the user desires to perform, wherein the one or more of the plurality of external devices facilitates performing the inferred user desired action; and
a proxy unit that communicates for the plurality of external devices by transmitting and receiving data with the interface component.

19. The computer readable medium of claim 18, the interface component transmits and receives data from the plurality of external devices via wireless communication.

20. The computer readable medium of claim 18, the MDA informs the portable communication device of the plurality of external devices.

21. A portable communication system, comprising:
means for wireless communication with a plurality of external devices;
means for determining existence of one or more of the plurality of external devices available to a portable communication device based upon an inferred state of a user employing the portable communication device, wherein the inferred user state comprises an inferred action that the user desires to perform, wherein the one or more of the plurality of external devices facilitates performing the inferred user desired action;
means for informing the user about the existence of the one or more of the plurality of external devices; and
means for communicating on behalf of at least one of the plurality of external devices.

22. The portable communication system of claim 21, further comprising:
means for requesting external device information; and
means for receiving the external device information.

* * * * *